(No Model.) 3 Sheets—Sheet 1.
W. ROBINSON.
ELECTRIC MOTOR CAR.
No. 436,742. Patented Sept. 16, 1890.
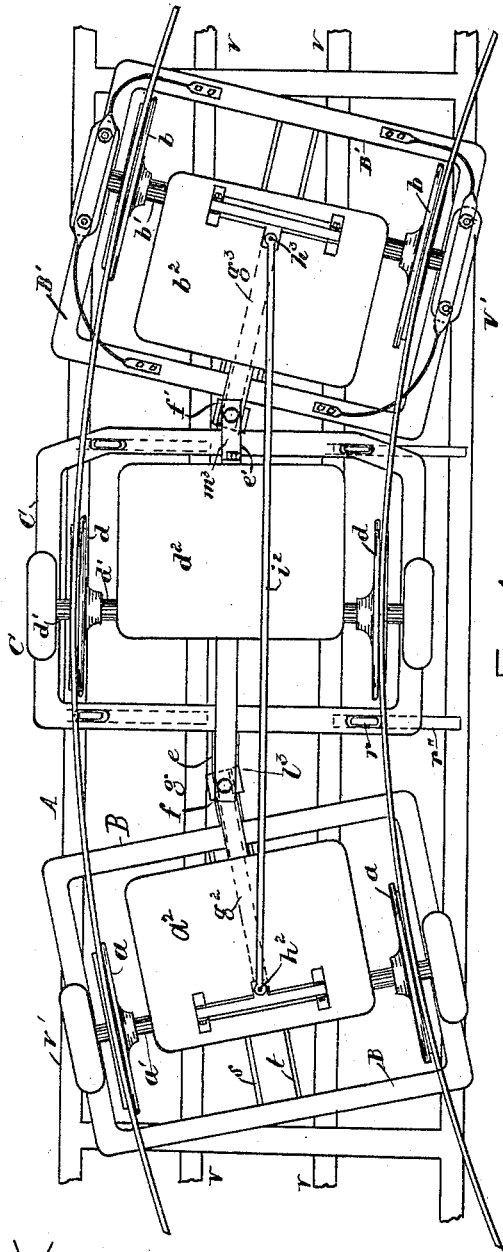
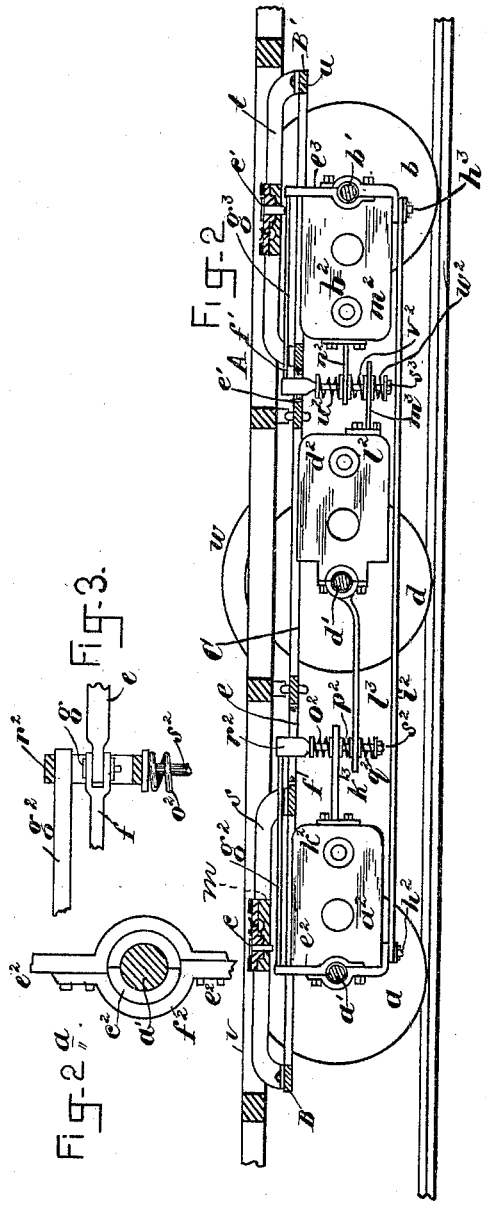
WITNESSES: INVENTOR:

(No Model.) 3 Sheets—Sheet 2.

W. ROBINSON.
ELECTRIC MOTOR CAR.

No. 436,742. Patented Sept. 16, 1890.

WITNESSES: Chas. J. Gordin, William Claus

INVENTOR: William Robinson (No Model.) 3 Sheets—Sheet 3.
W. ROBINSON.
ELECTRIC MOTOR CAR.
No. 436,742. Patented Sept. 16, 1890.
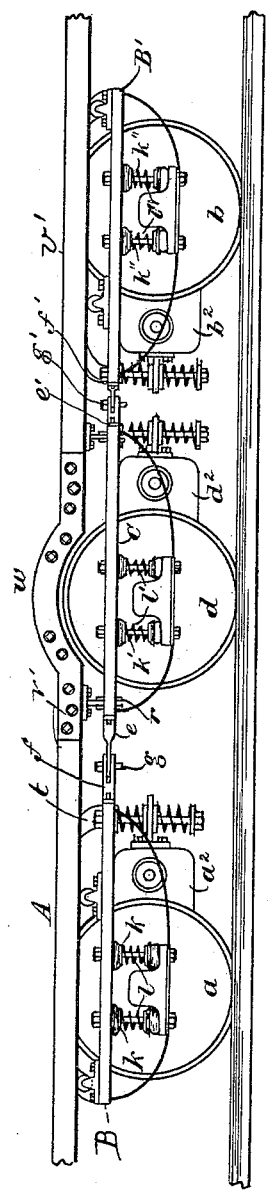
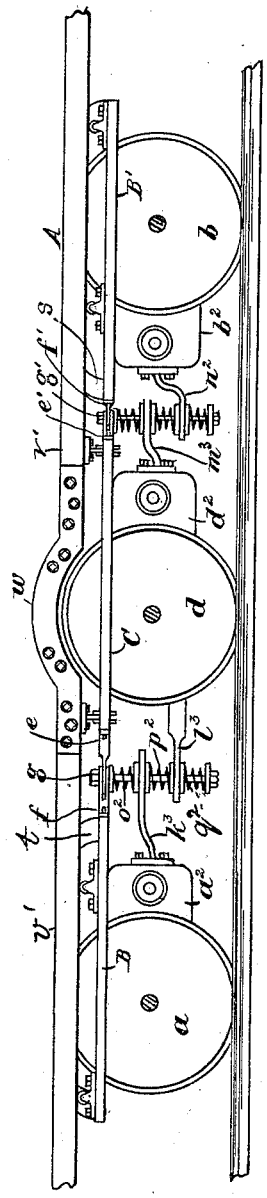
WITNESSES:
Chas. S. Goodwin.
William Claus
INVENTOR:
William Robinson

UNITED STATES PATENT OFFICE.

WILLIAM ROBINSON, OF BOSTON, MASSACHUSETTS, ASSIGNOR TO THE ROBINSON RADIAL CAR TRUCK COMPANY, OF PORTLAND, MAINE.

ELECTRIC-MOTOR CAR.

SPECIFICATION forming part of Letters Patent No. 436,742, dated September 16, 1890.

Original application filed April 12, 1889, Serial No. 304,041. Divided and this application filed February 19, 1890. Serial No. 341,047. (No model.)

*To all whom it may concern:*

Be it known that I, WILLIAM ROBINSON, a citizen of the United States, residing at Boston, in the county of Suffolk and State of Massachusetts, have invented a new and useful Improvement in Electric-Motor Cars, of which the following is a specification.

This case is Division C of my application for a patent for an improvement in electric-motor cars filed April 12, 1889, Serial No. 307,041.

The object of my invention is to construct a motor-car having axles adapted to take a radial position on curves, and to adapt and combine the electric motors with the radiating apparatus in a simple and practical manner, whereby cars with a long wheel-base may run around very sharp curves with the greatest ease, with economy of power, and without danger of leaving the track.

My invention also makes it possible to construct much longer cars than is at present feasible for electric-motor propulsion, to run them with great steadiness of motion, and to attain very high rates of speed with perfect safety and economy.

The nature of my invention will be clearly understood from the description which follows, reference being had to the accompanying drawings, which form a part of this specification, in which—

Figure 4:
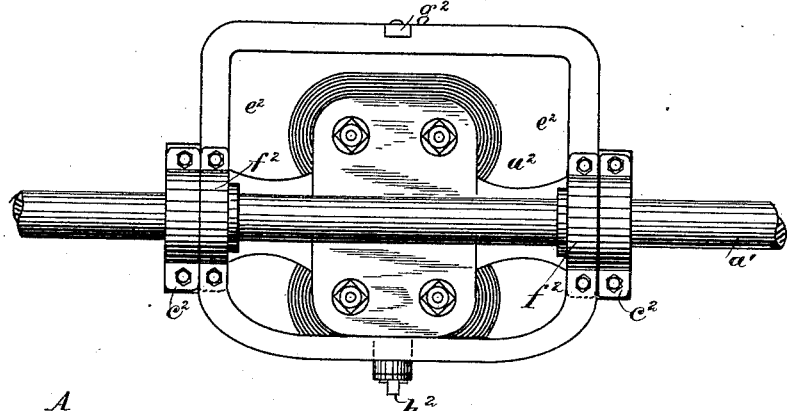
Figure 13:
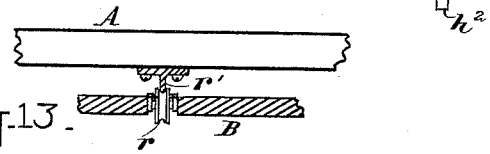
Figure 8:
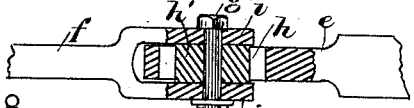
Figure 7:
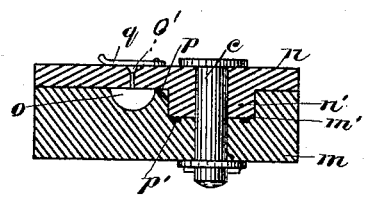
Figure 9:
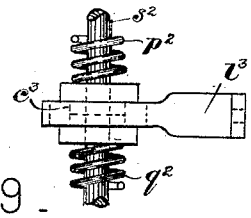
Figure 11:
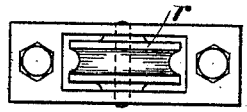
Figure 12:
Figure 10:
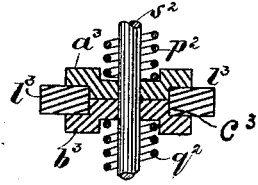

Figure 1 is a bottom plan view of a railway-car on a curved track, illustrating my invention. Fig. 2 is a side elevation of the same, partly in section, with the face-wheels removed. Fig. 2$^a$ is an enlarged section of the axle $a'$, showing the relation thereto of the motor-supporting connections. Fig. 3 is an enlarged view showing the opposite end of the motor-supporting bar and connections, a portion of one side being removed to show the relative position of the flexible joint of the bars $e\ f$. Fig. 4 is an end elevation illustrating part of the mechanism for suspending the motor flexibly from the axles. Figs. 5 and 6 are side elevations illustrating modifications in the method of suspending the motors flexibly. Fig. 7 is a longitudinal section showing the swiveling bearing of the car-frame on the axle-frame. Fig. 8 is a longitudinal section showing the mechanism for connecting the adjacent axle-frames adjustably together. Figs. 9 and 10 are enlarged views showing the means of supporting one end of the motor flexibly on springs; and Figs. 11, 12, and 13 are detail views showing the bearings between the corners or sides of the axle-frames and the car-frame.

Similar letters of reference indicate corresponding parts in all of the figures.

A is a car-frame provided with the swiveling axle-frames B B'. The axle-frame B is provided with wheels $a$ and the axle $a'$, connecting the same and the axle-frame B' with the wheels $b$, and the axle $b'$ connecting said wheels in the usual manner. The axle-frame B is pivoted to the car-frame at the point $c$ between the center of the axle $a'$ and the center of said car-frame, and the axle-frame B' is similarly pivoted to the car-frame at the point $c'$ between the center of the axle $b'$ and the center of said car-frame.

C is an axle-frame located between the axle-frames B and B' and adapted to slide bodily transversely relatively to said car-frame A. Said frame C is provided with the wheels $d$ and their connecting-axle $d'$. The axles $a'\ b'\ d'$ are flexibly connected to their respective frames B B' C by means of the pedestals $k\ k'\ k''$ and the springs $l\ l'\ l''$. The sliding frame C is provided with rigid projections or brackets $e\ e'$ on its opposite sides, and the frames B B', respectively, are provided with corresponding projections or brackets $f\ f'$. The brackets $e\ f$ are pivoted together adjustably, as shown at $g$, and the brackets $e'\ f'$ are similarly pivoted together, as shown at $g'$.

The operation is as follows: When the moving car reaches a curved track, the impinging of the flange of one of the intermediate wheels $d$ against one of the rails of the curved track causes said wheels and the axle $d'$, together with the intermediate frame C, to move transversely relatively to the car-frame A. This transverse movement of the frame C, with its brackets $e\ e'$, carries the brackets $f\ f'$ of the frames B B' to one side of the longitudinal center line of the car-frame A, thus causing said frames B B' to swivel on their respective axes $c$ and $c'$, whereby the axles $a'$ $b'$ are caused to take radial positions on curves, as shown in Fig. 1. The intermediate axle $d'$, being at the center of the car-frame, is of course always radial to any curve upon which the car may enter without any swiveling movement in the frame C.

I prefer to swivel the axle-frames B B' at points between the centers of the axles $a'$ $b'$, respectively, and the center of the car-frame. By this arrangement the pivot $c$ becomes a fulcrum, around which the wheels $a$ and axle $a'$ with the frame B swing as a lever, the impinging of the flange of the outer wheel $a$ against the outer rail of the track when a curve is reached giving the initial impetus of such swiveling movement. The same operation takes place in connection with the wheels $b$, axle $b'$, and frame B'.

It will be observed that the greater the distance the pivots $c$ $c'$ are from the axles $a'$ $b'$ the greater will the swiveling leverage be and the more easily therefore will the swiveling movement of said axles take place; also, the greater the distance of said swiveling points from said axles the less will be the lateral movement required of the sliding frame C to bring the swiveling axles into a true radial position on curves. Furthermore, by placing the pivotal point $c$ a short distance from the axle $a'$, as shown, and the pivotal point $g$ of the adjacent axle-frames midway, or nearly so, between said pivotal point $c$ and the intermediate axle $d'$—that is, the center of the car-frame—all slack and lost motion are taken up and the axles brought in a practical manner into an exactly radial position on curves. When the axles assume radial positions on curves, as shown in Fig. 1, the pivotal point $g$ is thrown to one side of the longitudinal center line of the car-frame and the brackets $e f$ and $e' f'$ slide upon and become elongated relatively to each other. To provide, therefore, for the free relative elongation and contraction of said brackets, I provide the bracket $e$ (see Fig. 8) with the longitudinal slot $h$, in which is placed the sliding friction-block $h'$, through which and the jaws $i$ of the bracket $f$ passes the pivotal bolt $g$. Thus flexible movement of the brackets $e f$ relatively to each other is provided for without lost motion or undue wear of the parts moving on each other. The brackets $e' f'$ are flexibly connected together in the same manner as the brackets $e f$ just described.

The swiveling axle-frames B B' are provided with the central swiveling bearing shown in Fig. 7, in which the plate $m$, provided with the socket $m'$, is secured to the axle-frame, and the car-frame is provided with the bearing-plate $n$, secured thereto. Said plate $n$ is provided with the projection $n'$, fitting into the socket $m'$ and swiveling therein. The bolt $c$, passing through the plates $n$ $m$, prevents the possibility of said swiveling plates separating from each other by a sudden jar or otherwise. The plate $m$ is provided with the recess $o$ for the reception of grease or oil, which may be poured into said recess through the orifice $o'$ in the upper plate $n$, for the purpose of lubricating the frictional surfaces of said plates. The channel $p$ leads from the recess $o$ to the socket $m'$ to allow a portion of the oil or grease to pass gradually into said socket, where it is retained by the recess $p'$ at the bottom of said socket $m'$. The orifice $o'$ is protected from dust by the plate $q$. Thus the bearing-plates $m$ $n$ are kept continuously lubricated in a simple and effective manner.

The sides or corners of the axle-frames are provided with roller-bearings, which I prefer to make as shown in Figs. 5, 11, 12, and 13, in which the rollers $r$, secured to the axle-frames, are grooved, and the bearing or track $r'$, secured to the car-frame A, rests upon said rollers and fits into the grooves of the same. The grooved roller-bearings, together with the socketed central bearings, it will be observed, allow ease of movement between the axle-frames and the car-frame A without lost motion. In Fig. 11 and some other figures the roller $r$ is provided with a groove semicircular in cross-section. In Fig. 12 the groove is angular, while in Figs. 1 and 2 the roller $r$ has its periphery convex in cross-section. In the latter case the roller $r$ travels in a grooved track $r''$.

The bars $s$ $t$ extend across and above the axle-frames B B' and are secured thereto. Between or upon said bars the swiveling bearing-plate $m$ is secured. Said bars $s$ $t$ are preferably made of iron or steel plates placed edge upward for strength. At or near the ends said plates are bent downward and secured to the axle-frame by the bolts $u$. Thus space is left under said bars for the motor to rise above the level of the surrounding wheel-frame, all as shown in Figs. 1 and 2, and more fully described hereinafter. The bars $s$ $t$ rise between the intermediate sills $v$ of the car-frame A, thus economizing space, and also for the purpose of economizing space the bearing-plate $n$ is secured to the car-frame at or near the upper surface of said sills.

In order that the intermediate wheels $d$ may have extreme lateral movement without raising the car-body unduly, the side sills $v'$ are cut away or arched upward at the middle, and the disconnected or arched parts are connected and re-enforced by the vertical arching plates $w$—one on each side of the sill—said plates being firmly bolted to the sides of said sill, as shown. Thus the central wheel is permitted to move under said arch, while all the normal strength of said sill is retained.

It will be observed that when the car passes from a curved to a straight track the impinging of the flanges of the wheels on the rails causes all the axles and wheel-frames to assume their normal position and all the axles on the car become parallel to each other. Thus the axles become radial on curves and parallel on straight lines and only on straight lines.

The axles $a'$ $b'$ $d'$ are provided, respectively, with the motors $a^2$ $b^2$ $d^2$. Each of said motors has one end supported by its axle, as shown. Fig. 4 clearly shows the motor $a^2$ as having one end supported on the axle $a'$ by the sleeves $c^2$ in any usual or suitable manner.

The opposite ends of the motors are supported flexibly in a peculiar manner, as follows: The bar or frame $e^2$, formed of one or more pieces, is secured adjustably on the motor-sleeves $c^2$, as shown at $f^2$, whereby the motor and said bar are adjustable somewhat relatively to each other in a vertical plane. Rigidly secured to the bar $e^2$ or forming a part thereof is the horizontal bar $g^2$, extending, preferably, above the axle-frame B to or beyond the connecting-point $g$ of the adjacent axle-frames. The lower end of the bar or frame $e^2$ terminates in the swiveling point or bearing $h^2$, which is in a vertical line with the swiveling point $c$ of the axle-frame on the car-body. The axle $b'$ is provided with a similar bar $e^3$, horizontal bar $g^3$, and swiveling point or bearing $h^3$. The bars $e^2$ $e^3$ are connected by the horizontal bar $i^2$ and swivel on said bar at the points $h^2$ $h^3$, as shown. From the free or inner end of the bar $g^2$ is suspended by the bracket $k^3$ the free end $k^2$ of the motor $a^2$, as shown at $r^2$, and from the free or inner end of the corresponding bar $g^3$ are suspended by the brackets $m^3$ $n^2$ the free ends $l^2$ $m^2$ of the motors $d^2$ $b^2$, as shown. The bracket $l^3$ is rigidly secured to the back end of the intermediate motor $d^2$ and has its free end supported by the end of the bar $g^2$. The springs $o^2$ $p^2$ $q^2$ are placed around the supporting-rod $s^2$, which is supported at $r^2$ from the bar $g^2$, as shown, whereby the motors $a^2$ $d^2$ are flexibly supported from said bar $g^2$ by said springs. In a similar manner the ends $l^2$ $m^2$ of the motors $d^2$ $b^2$ are supported flexibly by the springs $u^2$ $v^2$ $w^2$, said springs in turn being supported by the bar $g^3$. It will be observed that the motor-sleeves $c^2$ are adapted to turn adjustably within that part of the bar $e^2$ surrounding said sleeves. Consequently the free end $k^2$ of the motor is free to move up and down adjustably relatively to the supporting-bar $g^2$. The bar $e^2$ would operate as well if sleeved directly to the axle; but this would involve the additional and unnecessary friction and expense of additional journal-boxes. I therefore prefer to support said bar $e^2$ on the motor-sleeves $c^2$, as described. The bar $i^2$, engaging the lower ends of the bars $e^2$ $e^3$, keeps the bars $g^2$ $g^3$ in a horizontal position, notwithstanding the fact that a large proportion of the weight of the motors is supported by said last-named bars. The adjacent motors $a^2$ $d^2$, however, practically support and balance each other flexibly through their respective brackets $k^3$ $l^3$ and the springs $o^2$ $p^2$ $q^2$, as shown. Furthermore, the intermediate motor $d^2$ becomes to a large extent an equalizer between the other two motors. When the intermediate motor $d^2$ is omitted, then the bracket $l^3$, supported by the axle $d'$, extends therefrom in both directions, terminating on one side in the bracket $m^3$—that is, the bracket $l^3$ extended becomes a perfect equalizer, supporting the motors $a^2$ $b^2$ equally, thus relieving the weight on the bars $g^2$ $g^3$ and distributing such weight as remains equally between said bars. The supporting-rod $s^2$ passes through the spring-seats $a^3$ $b^3$, which support the bracket $l^3$. (See Figs. 9 and 10.) The bracket $l^3$ is provided with the slot $c^3$, through which the stems of the spring-seats $a^3$ $b^3$ pass and meet without pressing tightly upon the upper and lower surfaces of the bracket $l^3$. Thus said bracket $l^3$ is adapted to move back and forth with entire freedom relatively to said spring-seats.

The bearing and operation of the bracket $m^3$ on its spring-seats are the same as that of the bracket $l^3$, just described, on its spring-seats. The rod $s^2$ connects adjustably the motors $a^2$ $d^2$ in the same vertical line with the bolt or pin $g$, which adjustably connects the axle-frames B C, and in like manner the rod $s^3$ connects adjustably the motors $d^2$ $b^2$ in the same vertical line with the bolt or pin $g'$, which adjustably connects the axle-frames C B'.

When the car enters upon a curve, the normal position of the motors relatively to each other is changed. Thus the intermediate motor $d^2$ is carried bodily with the axle $d'$ in a transverse direction relatively to the car-frame A, while the motors $a^2$ $b^2$ swivel in a horizontal plane on the same vertical axes around which their respective axles $a'$ $b'$ swivel. At the same time the brackets $k^3$ $l^3$ and $m^3$ $n^2$ elongate relatively to each other in taking the relative angular position, all as illustrated in Fig. 1.

It will be observed that in the method of operation above described the motors are wholly supported by the axles—a great desideratum—since by this arrangement vibrations from the motors are not conveyed to the car-body, and it is only necessary to make the car-springs heavy enough to carry the car-body with its load of passengers without supporting any of the weight of the motors. Thus my invention makes my motor-car a much easier riding-vehicle than the motor-cars heretofore used.

Figs. 5 and 6 illustrate modifications in the method of flexibly supporting the motors. In Fig. 5, as will be seen by inspection, the free ends of the motors are suspended by springs from their respective axle-frames, while in Fig. 6 the mode of suspension is similar, but the lines of suspension coincide with the flexible joints $g$ and $g'$. In both of these cases, it will be observed, the motors partly support and balance each other, as described in connection with Figs. 1 and 2.

An inspection of Fig. 2 will show that the axle-frames have an open space within their periphery large enough for the motor to move adjustably within and above or below said frames during the relative vertical movement of said motors and the car-frame. For this reason I raise the bearing-bars *s t* above the upper surface of said axle-frames, as clearly illustrated in Fig. 2. This arrangement also allows room for brake-rods and other gearing above the motors.

It is obvious that the invention herein described is equally applicable to six-wheeled trucks for coaches having two trucks and to cars having only six wheels in all. The term "car-frame" therefore herein used must be construed, for the purposes of this invention, as equivalent to the term "truck-frame" or "main truck-frame."

Having thus described my invention, what I claim as new, and desire to secure by Letters Patent, is—

1. In a motor car or truck, the combination, substantially as described, of the main frame, the driving-axle and wheels, and a motor arranged to drive the same, said motor and axle being movable together in a horizontal plane relatively to said main frame.

2. In a motor car or truck, the combination, substantially as described, of the main frame, a driving-axle with its wheels, and a motor arranged to drive the same, said motor and axle being arranged to swivel around a vertical axis relatively to said main frame.

3. In a motor car or truck, the combination, substantially as described, of the main frame, an axle or axles having a lateral or swiveling motion around a vertical axis relatively thereto, a driving-axle with its wheels, and a motor arranged to drive the same, said driving-axle and motor being movable transversely relatively to said main frame.

WILLIAM ROBINSON.

Witnesses:
 GEO. A. FREEMAN,
 HENRY C. WHITE.